April 25, 1933.  H. A. WALKER  1,905,077
SAFETY MEANS FOR HYDRAULIC BRAKES
Filed July 19, 1930
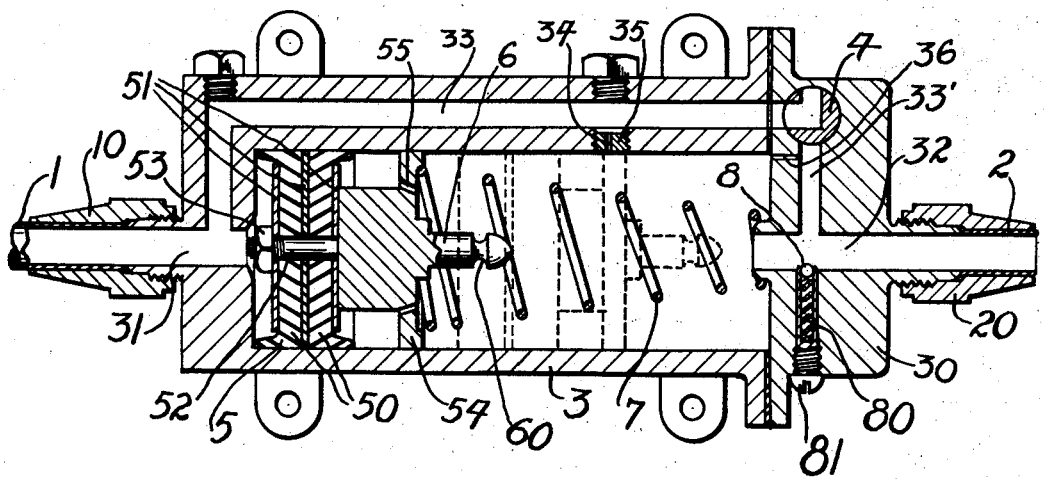
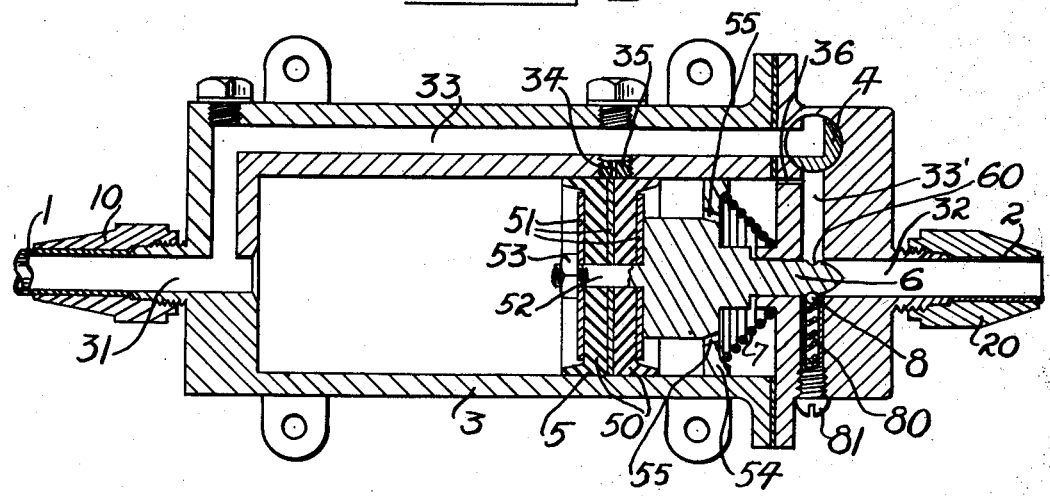
Inventor
Henry A Walker
By Charles L. Reynolds
Attorney Patented Apr. 25, 1933

1,905,077

UNITED STATES PATENT OFFICE

HENRY A. WALKER, OF ROCKPORT, WASHINGTON

SAFETY MEANS FOR HYDRAULIC BRAKES

Application filed July 19, 1930. Serial No. 469,026.

My invention relates to hydraulic installations, such as hydraulic four-wheel brakes upon an automobile.

In any hydraulic installation, where a number of devices are operated from a single pressure source, by means of individual lines or conduits running from the pressure source to the individual devices, it is desirable to provide some means whereby, in the event of rupture in one of the individual lines, all of the fluid which transmits the pressure will not be lost through that rupture, thus rendering the other devices inoperative. In particular, this is essential in four-wheel brake installations, for if a rupture occurs in the line leading to one brake, unless some such safety means is provided, the entire complement of brakes is rendered inoperative, and there will most probably result a serious accident.

It is the object of my invention, then, to provide a safety means interposed between the pressure source and the operating device, by means of which pressure is transmitted from the pressure source to the operating device, such as the individual brake (or in the case of the two front wheels, to the two wheels jointly), so arranged that if a rupture occurs beyond the safety device, that line only will be put out of operation, and the pressure will be retained to permit operation of the other brakes, so that the car may be stopped thereby.

It is a further object, in connection with such a device as has been indicated, to provide a means whereby, following a rupture, the break may be repaired and communication re-established between the pressure source and the brakes, and the safety device put in condition for further normal operation, without the necessity of opening, adjusting, or doing anything to the safety device; in other words, it is my object to provide a safety device the normal operation of which, following a rupture, is automatically resumed when normal pressure and fluid conditions are resumed.

A further object is to provide suitable bleeder means, one to insure equalization of pressure between the pressure supply end and the pressure transmitting end, and another to permit emptying the safety device of air following a rupture.

A further object is the provision of a device of the character described, which shall be simple in construction and reliable in operation, and which is constructed of a small number of parts, relying to the minimum on intricate parts or parts requiring fine adjustment.

My invention comprises the novel parts and the novel combination and arrangement thereof as shown in the accompanying drawing, described in this specification, and as will be more particularly defined by the claims terminating the same.

In the accompanying drawing, I have shown my invention in the form which is now preferred by me.

Figures 1 and 2 are axial sections through the safety device, showing it respectively in position of rest and in the position assumed following a rupture.

I have not deemed it necessary to illustrate the hydraulic brake system of an automobile, since my device may be connected in various such systems, or in other hydraulic systems. It is to be understood, then, that the conduit 1 extends from the pressure supply source, whatever may be its character, and the conduit 2 extends to the hydraulically operated device, such as the individual brake. The conduit 1, therefore, may be designated the pressure supply conduit, and conduit 2 the pressure transmitting conduit. These are coupled to opposite ends of a cylinder 3, or to the head 30 thereof, by suitable couplings, as indicated at 10 and 20 respectively.

Ports 31 and 32, at opposite ends of the cylinder, afford communication with the respective conduits 1 and 2. In addition, there is provided a by-pass 33, 33', which extends from the port 31 to the port 32, being interrupted, however, by a valve 4 of any suitable design, which can be turned to place the end 33' of the by-pass into communication with the main portion 33 thereof, or which may be turned, as is shown in the drawing, into position to interrupt communication between these two parts of the by-pass.

The latter is the normal position of the valve 4, and the by-pass is therefore normally closed.

Within the cylinder 3 is movable a piston 5, which may be suitably constructed or built up, and which, as shown, comprises two cupped discs 50, which may be constructed of rubber or like material, supported between washers 51 received upon a stem 52 and held in place by a nut 53. The stem 52 is secured in or projects from a guide block 54, from which projects forwardly a stem 6, having a circumferential groove 60 adjacent its end. I prefer that a spring 7 be employed, the purpose of which is to urge the piston to the left, that is toward its normal position of rest as seen in Figure 1. Reacting pressure will also serve to perform this function, as will be explained later, and the spring might be omitted, but the reacting pressure alone would act too slowly and uncertainly, so I prefer to use the spring. This normally assists the reacting pressure to hold the piston in or to return it promptly to its position of rest.

In the normal operation of the device, pressure applied through the conduit 1, not being permitted to escape through the by-pass 33, urges the piston 5 to the right, as seen in the drawing, this transmitting pressure through the cylinder and through the port 32 and conduit 2 to the brake to which the conduit 2 is connected. The piston moves to the right, compressing the spring 7, but parts are so proportioned, with respect to the capacity of the brake, that the piston normally will not move to the extreme right end of the cylinder, but will move to some such position as is indicated in dotted lines in Figure 1.

It may be noted here that there is a bleeder port 34 affording communication between the main portion of the by-pass 33 and the right-hand end of the cylinder 3, but this bleeder port is of such small size that pressure applied suddenly as it is in applying the brakes of an automobile, can not escape through this bleeder, but is caused to move the piston instead. However, when the piston is in position of rest, if there should be any slight inequality of pressure between the fluid in the conduit 2 and the fluid in the conduit 1, such inequality is equalized through the bleeder 34. It will be noted that this bleeder is formed in a plug 35, which can be removed and a plug with a different sized bleeder port may be substituted therefor.

During normal operation, then, the piston moves from the full line position of Figure 1 to some such limit of position as is indicated by the dotted line showing in Figure 1. Upon rupture in the conduit 2 or in the brake to which it is connected, permitting leakage of the oil used to transmit pressure, application of pressure through the conduit 1 will force the piston 5 to the extreme right, there being no reacting pressure from the brake, and the spring 7 being so proportioned that it is incapable of holding the piston against the pressure applied through the conduit 1. The stem 6 will enter the port 32, and at the proper location within this port I provide a spring-pressed ball catch, the ball 8 being held projected by a spring 80 received within a removable casing 81 in the head 30 of the cylinder. When the ball 8 is engaged within the groove 60, as indicated in Figure 2, the piston 5 will be held against the action of the spring 7, and the bleeder port 34 in this position of the piston is closed by the piston itself. Or, it may be so located as to afford communication only to the pressure side of the piston, when the latter is not in this extreme position. In any event, there is no communication afforded between the pressure supply end and the pressure transmitting end of the cylinder. This prevents leakage and loss of fluid, and permits the remaining brakes to be operated in the usual manner. Thus accidents to the car can be avoided, and the car can be operated until repairs can be made to the brake which is out of order.

Upon repairing the rupture, it is necessary that the lost fluid be supplied to the pressure transmitting conduit 2 and associated passages, and that air be removed therefrom. This may now be accomplished by turning the valve 4 to place the by-pass 33 in communication with the port 32. Oil (or whatever fluid is employed in the system) is supplied through the conduit 1, the port 31, and the by-pass 33, 33', to the port 32 and the conduit 2. The end of the stem 6 is enough smaller than the port 32 that such passage of the fluid is permitted. The brake is bled to remove the air in the usual manner, and in order to relieve air from the small chambers at the righthand end of the cylinder, and from the chamber within the piston or the guide block 54, a bleeder port 36 is provided at the top of the cylinder leading into the port 33' at the pressure transmitting side of the valve 4, and ports 55 may be provided in the guide block 54.

Now that the air has been bled from the piston, and fluid has been supplied to the brake and to the pressure transmitting conduit 2 to replace that which was lost, and the pressure in the brake is the same as that in the pressure supply source, it is only necessary to close the valve 4 again and to release the pressure of the conduit 1, whereupon the reacting pressure in the conduit 2 acts upon the piston 5, tending to force it to the left, and assisting the spring 7, if the spring be employed, to disengage the piston from the hold of the ball-catch 8. Any deficiency of oil is supplied from the by-pass 33 through the now uncovered bleeder port 34 and the ports 55. It follows, then, that the catch holds so long as there is no pressure in the conduit 2, but that its release following the supply of additional fluid and pressure in the conduit 2 is automatically obtained, and the brake is again ready for service.

What I claim as my invention is:

1. In combination with a pressure supply conduit and a pressure transmitting conduit, a cylinder connected as its opposite ends to the respective conduits, a piston normally movable from a position of rest, at the pressure end of the cylinder, towards the opposite end, but normally stopping short of such end, its return being induced by reacting pressure through the pressure transmitting conduit, means for engaging and holding said piston following abnormal movement away from the pressure end, but releasable upon application of reacting pressure, and communication means for placing the pressure transmitting end in communication with the pressure supply end, at will, comprising a valved by-pass connecting the two ends of the cylinder, normally closed, and a bleeder port connecting the top of the cylinder with said by-pass, beyond the pressure side of the valve.

2. In combination with a pressure supply conduit and a pressure transmitting conduit, a cylinder connected at its opposite ends to the respective conduits, a piston normally movable from a position of rest, at the pressure end of the cylinder, towards the opposite end, but normally stopping short of such end, its return being induced by reacting pressure through the pressure transmitting conduit, means for engaging and holding said piston following abnormal movement away from the pressure end, but releasable upon application of reacting pressure, comprising a circumferentially grooved stem on said piston aligned with and of a size to enter the pressure transmitting outlet of the cylinder, and a ball-catch in such outlet engageable with said groove.

3. In combination with a pressure supply conduit and a pressure transmitting conduit, a cylinder connected at its opposite ends to the respective conduits, a piston normally movable from a position of rest, at the pressure end of the cylinder, towards the opposite end, but normally stopping short of such end, its return being induced by reacting pressure through the pressure transmitting conduit, means for engaging and holding said piston following abnormal movement away from the pressure end, but releasable upon application of a reacting pressure, comprising a circumferentially grooved stem on the piston aligned with and of a size to enter the pressure transmitting outlet of the cylinder, a ball-catch in such outlet engageable with said groove, and communication means for placing the pressure transmitting end of the cylinder in communication with the pressure supply end at will, comprising a by-pass terminating adjacent such ball-catch, the end of the stem being spaced from the outlet walls to permit communication, when the catch is engaged, between the by-pass and the pressure transmitting conduit.

Signed at Rockport, Washington, this 11th day of July, 1930.

HENRY A. WALKER.